United States Patent
Kling et al.

(10) Patent No.: US 10,612,400 B2
(45) Date of Patent: Apr. 7, 2020

(54) COMPOSITE FAN PLATFORM LUG REINFORCEMENT

(71) Applicant: United Technologies Corporation, Farmington, CT (US)

(72) Inventors: Colin J. Kling, Glastonbury, CT (US); Darin S. Lussier, Guilford, CT (US); David R. Lyders, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 150 days.

(21) Appl. No.: 15/823,229

(22) Filed: Nov. 27, 2017

(65) Prior Publication Data

US 2019/0162119 A1  May 30, 2019

(51) Int. Cl.

| F01D 25/24 | (2006.01) |
|---|---|
| F01D 9/04 | (2006.01) |
| F01D 11/00 | (2006.01) |
| F01D 5/14 | (2006.01) |
| F01D 5/30 | (2006.01) |

(52) U.S. Cl.
CPC ............ *F01D 5/3053* (2013.01); *F01D 5/147* (2013.01); *F01D 9/04* (2013.01); *F01D 11/008* (2013.01); *F01D 25/246* (2013.01); *F05D 2220/32* (2013.01); *F05D 2220/323* (2013.01); *F05D 2220/36* (2013.01); *F05D 2230/64* (2013.01); *F05D 2240/80* (2013.01); *F05D 2260/30* (2013.01); *F05D 2300/10* (2013.01); *F05D 2300/603* (2013.01); *F05D 2300/614* (2013.01)

(58) Field of Classification Search
CPC ........ F01D 5/30; F01D 5/3007; F01D 5/3015; F01D 5/3053; F01D 11/006; F01D 11/008; F01D 5/147; F01D 9/04; F01D 25/246

See application file for complete search history.

(56) References Cited

U.S. PATENT DOCUMENTS

| 5,102,302 | A | 4/1992 | Schilling et al. |
|---|---|---|---|
| 5,240,377 | A | 8/1993 | Farr |
| 8,246,310 | B2 * | 8/2012 | Pierrot ................... F04D 29/321 416/220 R |
| 8,449,260 | B2 | 5/2013 | Xie et al. |
| 9,145,784 | B2 * | 9/2015 | Evans ................... F01D 5/3092 |
| 9,739,162 | B2 * | 8/2017 | Bottome ............... F01D 11/008 |
| 9,759,226 | B2 | 9/2017 | Duelm et al. |
| 2012/0163978 | A1 | 6/2012 | Darkins, Jr. et al. |

(Continued)

FOREIGN PATENT DOCUMENTS

JP    2011220325    11/2011

OTHER PUBLICATIONS

European Patent Office, European Search Report dated Mar. 25, 2019 in Application No. 18206473.3.

*Primary Examiner* — Nathaniel E Wiehe
*Assistant Examiner* — Michael K. Reitz
(74) *Attorney, Agent, or Firm* — Snell & Wilmer LLP

(57) ABSTRACT

A reinforced component in accordance with various embodiments includes a metal lug configured to be attached to a secondary component. The reinforced component further includes a composite material integrally formed around the metal lug and configured to be retained in place relative to the secondary component via an attachment between the metal lug and the secondary component.

18 Claims, 7 Drawing Sheets

(56) References Cited

U.S. PATENT DOCUMENTS

2016/0201505 A1 7/2016 Clarkson et al.
2017/0030205 A1 2/2017 Brown et al.
2017/0101878 A1 4/2017 Wang et al.

\* cited by examiner

COMPOSITE FAN PLATFORM LUG REINFORCEMENT

FIELD

The present disclosure relates generally to reinforced composite components for use with gas turbine engines and, more particularly, to a reinforced component having a composite material with an integral metal lug.

BACKGROUND

Gas turbine engines typically include a fan section, a compressor section, a combustor section and a turbine section. Components of gas turbine engines may be coupled together in various manners. For example, a platform of the fan section may be coupled to a hub of the fan section via insertion of a pin through openings in the platform and the hub. Occasionally, the material of the platform may have an insufficient yield or tensile strength to retain the pin during operation of the gas turbine engine without damage to the platform.

SUMMARY

Described herein is a reinforced component in accordance with various embodiments. The reinforced component includes a metal lug configured to be attached to a secondary component. The reinforced component further includes a composite material integrally formed around the metal lug and configured to be retained in place relative to the secondary component via an attachment between the metal lug and the secondary component.

In any of the foregoing embodiments, the composite material includes fibers and a resin to resist relative movement of the fibers.

Any of the foregoing embodiments may also include an adhesive that is compatible with the resin and is positioned around the metal lug to facilitate joining the metal lug to the composite material.

In any of the foregoing embodiments, the metal lug defines a through hole configured to receive a pin, and the metal lug is configured to be attached to the secondary component via the pin.

In any of the foregoing embodiments, the composite material forms a platform configured to be positioned between blades of a gas turbine engine, and the secondary component is a hub of the gas turbine engine.

In any of the foregoing embodiments, the composite material is configured for use with a gas turbine engine having an axis; the metal lug is tapered towards an axially forward end and an axially aft end; and the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

In any of the foregoing embodiments, the composite material is configured for use with a gas turbine engine having an axis, and the metal lug has a main body and two circumferential wings extending circumferentially outward from the main body.

In any of the foregoing embodiments, the composite material is configured for use with a gas turbine engine having an axis, and the metal lug has a radially outward surface that is contoured to a desired shape of the composite material.

Also disclosed is a system in accordance with various embodiments for coupling components of a gas turbine engine. The system includes a secondary component defining a component opening. The system also includes a reinforced component having a metal lug defining a through hole, and a composite material integrally formed around the metal lug. The system also includes a pin configured to extend through the component opening and the through hole to couple the reinforced component to the secondary component.

In any of the foregoing embodiments, the composite material includes fibers and a resin to resist relative movement of the fibers.

In any of the foregoing embodiments, the reinforced component further includes an adhesive that is compatible with the resin and is positioned around the metal lug to facilitate joining the metal lug to the composite material.

In any of the foregoing embodiments, the secondary component is a hub of the gas turbine engine, and the composite material forms a platform configured to be positioned between blades of the gas turbine engine.

In any of the foregoing embodiments, the blades are blades of a fan section of the gas turbine engine.

In any of the foregoing embodiments, the metal lug is tapered towards an axially forward end and an axially aft end, and the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

In any of the foregoing embodiments, the metal lug has a main body and two circumferential wings extending circumferentially outward from the main body.

In any of the foregoing embodiments, the metal lug has a radially outward surface that is contoured to a desired shape of the composite material.

Also disclosed is a gas turbine engine in accordance with various embodiments. The gas turbine engine includes a fan section having blades. The gas turbine engine further includes a compressor section configured to compress air received from the fan section. The gas turbine engine further includes a combustor section configured to combust a mixture of fuel and the air to generate exhaust. The gas turbine engine further includes a turbine section configured to receive the exhaust and convert the exhaust into mechanical energy to drive the blades. The gas turbine engine further includes a secondary component positioned in at least one of the fan section, the compressor section, the combustor section, or the turbine section and defining a component opening. The gas turbine engine further includes a reinforced component having a metal lug defining a through hole, and a composite material integrally formed around the metal lug. The gas turbine engine further includes a pin configured to extend through the component opening and the through hole to couple the reinforced component to the secondary component.

In any of the foregoing embodiments, the composite material includes fibers and a resin to resist relative movement of the fibers, and the reinforced component further includes an adhesive that is compatible with the resin and is positioned around the metal lug to facilitate joining the metal lug to the composite material.

In any of the foregoing embodiments, the metal lug is tapered towards an axially forward end and an axially aft end, and the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

In any of the foregoing embodiments, the metal lug has a main body and two circumferential wings extending circumferentially outward from the main body, and the metal lug has a radially outward surface that is contoured to a desired shape of the composite material.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
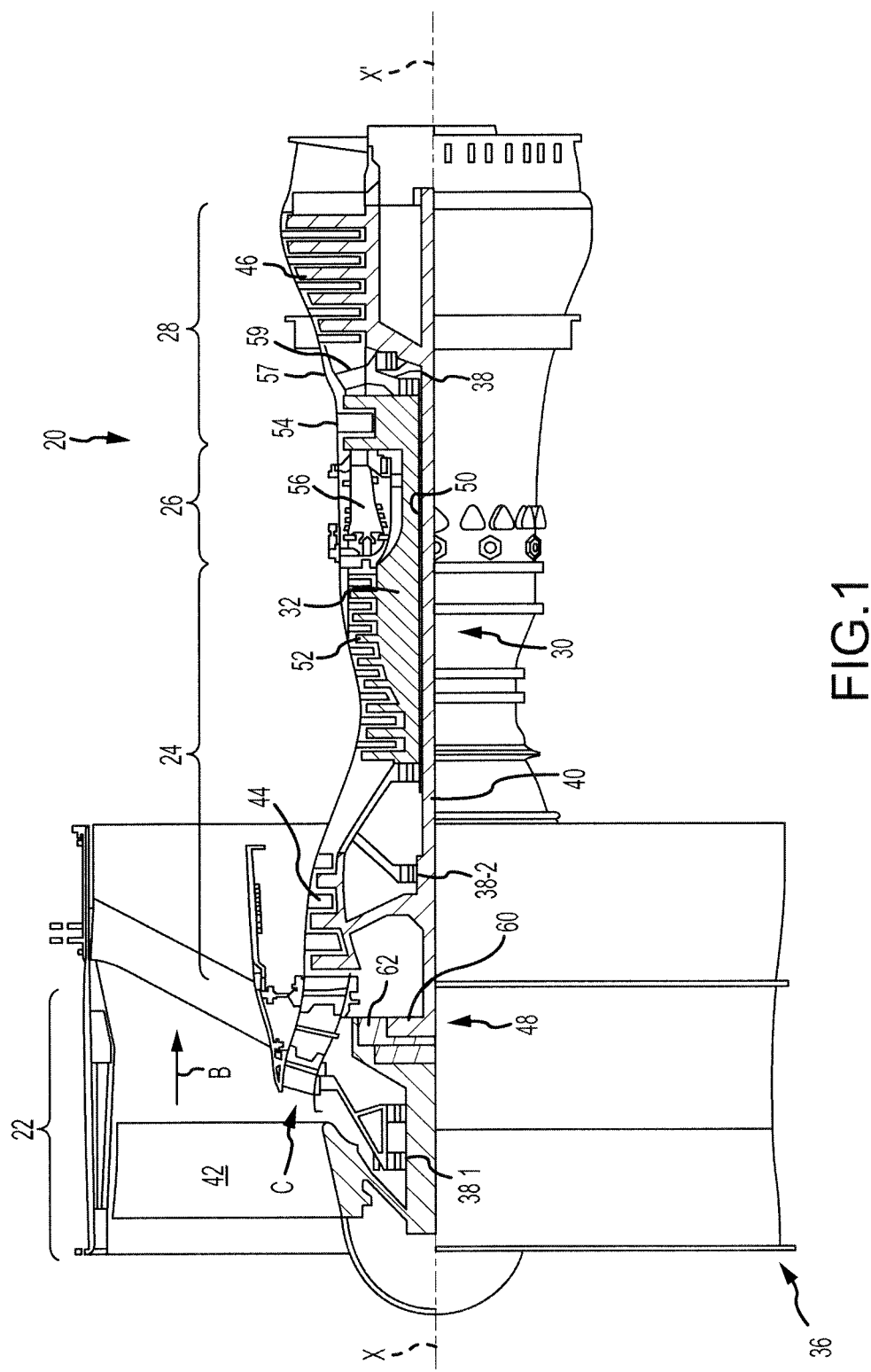
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. Alternative engines include an augmentor section among other systems or features. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or second) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Referring now to FIGS. 2, 3, 4, and 5, the gas turbine engine 20 may include a system 101 for coupling components of the gas turbine engine 20 together. The system 101 may include a secondary component 104, a reinforced component 106, and a pin 108 coupling the secondary component 104 to the reinforced component 106. In various embodiments, the secondary component 104 may be a hub 105 of the fan section 22 and the reinforced component 106 may be a platform 107 of the fan section 22.

The fan 42 may include multiple blades 100, 102 that are received by slots 103 of the secondary component 104 to couple the blades 100, 102 to the secondary component 104. The reinforced component 106 may be located between the blades 100, 102 of the fan 42. In that regard, the reinforced component 106 may define or include a flowpath surface 110 over which air is blown by the fan 42 as shown by an arrow 112.

Figure 3:
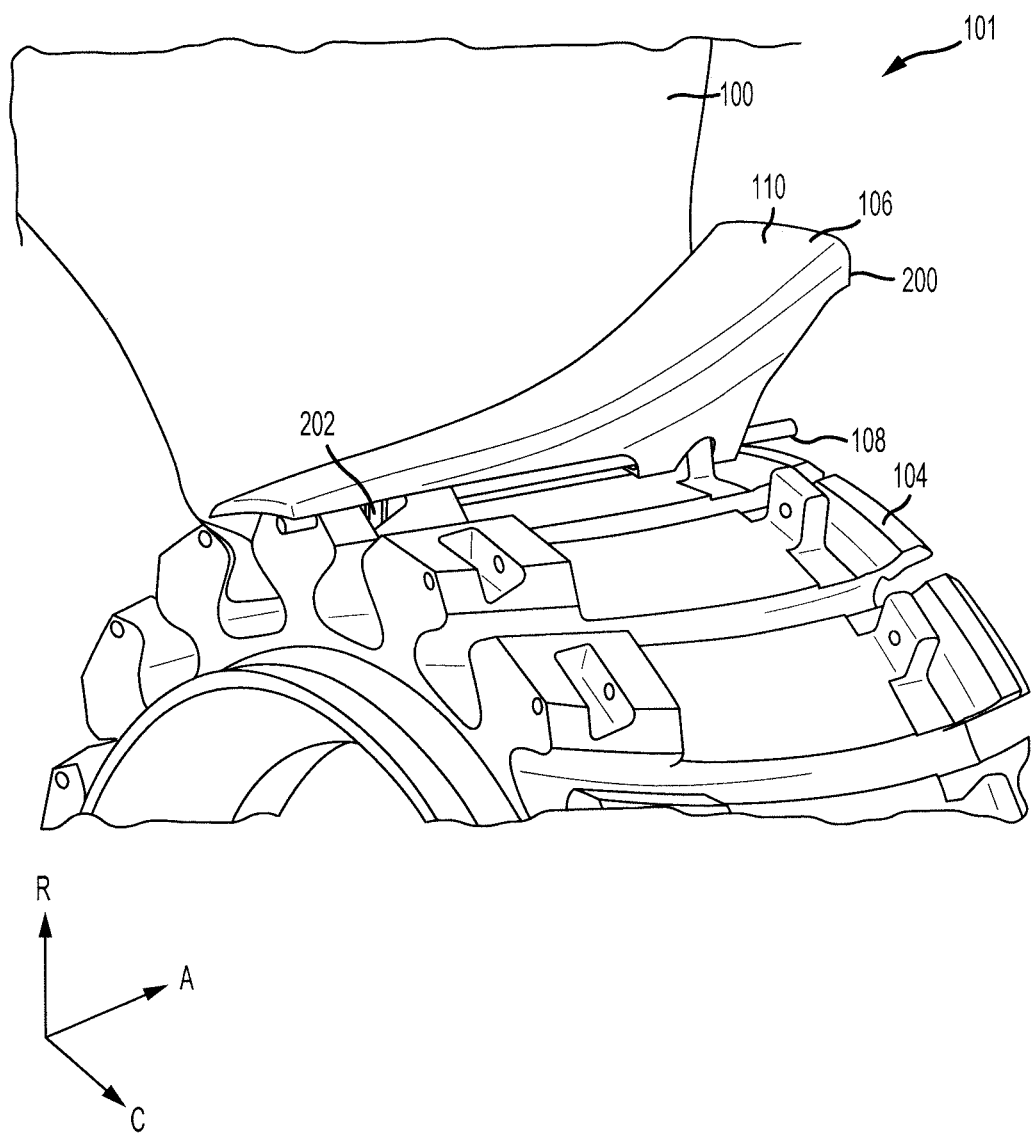
FIG. 3 is a perspective view of the portion of the fan section of FIG. 2, in accordance with various embodiments.
Figure 4:
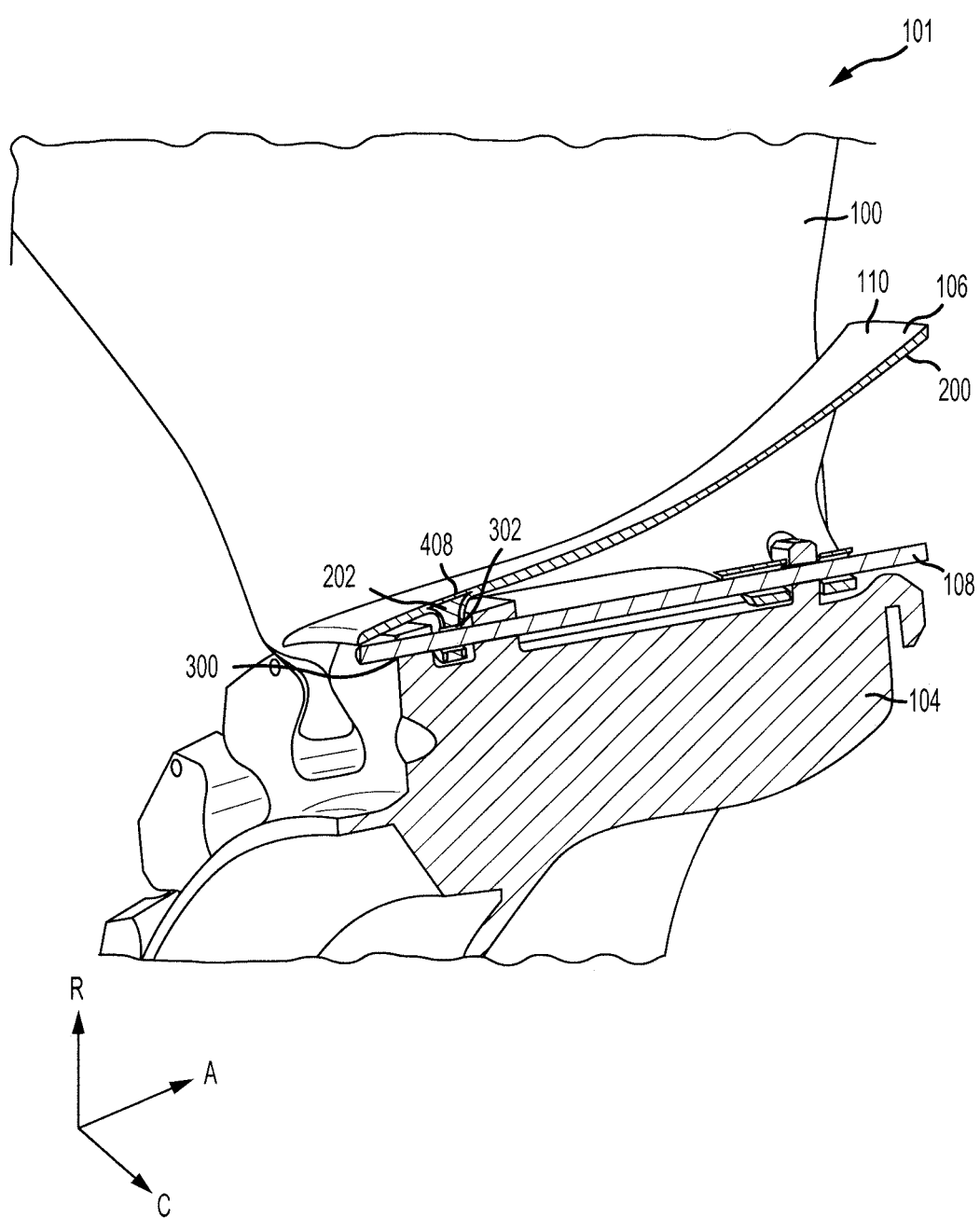
FIG. 4 is a perspective cross-sectional view of the portion of the fan section of FIG. 2, in accordance with various embodiments.
Figure 5:
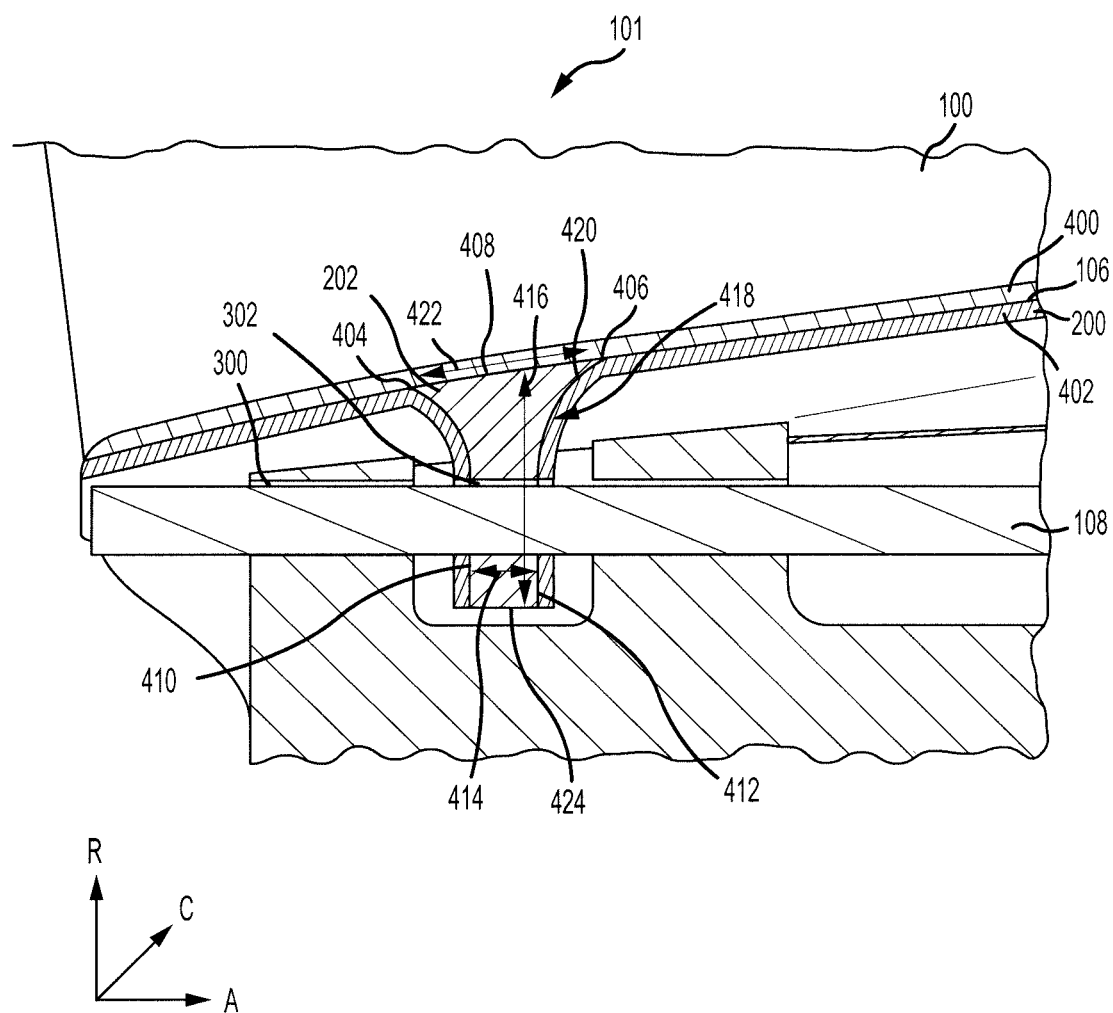
FIG. 5 is a cross-sectional view of the portion of the fan section of FIG. 2 including a reinforced component having a composite material and an integral metal lug, in accordance with various embodiments.

Referring to FIGS. 3, 4, and 5, the reinforced component 106 may include a composite material 200 and a metal lug 202. The secondary component 104 may define a component opening 300, and the metal lug 202 may define a through hole 302. The pin 108 may extend through the component opening 300 and the through hole 302 in order to couple the secondary component 104 to the reinforced component 106.

The composite material 200 may include any composite material. For example and referring briefly to FIG. 7, the composite material 200 may include a fiber reinforced composite material. For example, the composite material 200 may include a plurality of fibers 602 along with a resin 600 that retains the fibers 602 in place.

Returning reference to FIGS. 3, 4, and 5, the metal lug 202 may be formed from any metal. For example, the metal lug may include a steel, aluminum, titanium, an alloy, a nickel alloy, or the like. In various embodiments, titanium may provide a desirable combination of being relatively lightweight and having a relatively great, or high, yield strength.

Referring to FIG. 5, the composite material 200 may include a first ply or pack 400 and a second ply or pack 402. A pack may refer to a plurality of plies that are coupled together. The metal lug 202 may include a radially outward surface 408 extending between an axially forward end 404 and an axially aft and 406. The metal lug 202 may taper towards the axially forward end 404 and the axially aft end 406. The metal lug 202 may further include an axially forward surface 410 and an axially aft surface 412.

In order to create the reinforced component 106, the metal lug 202 may be formed using any known process, such as casting, and then may be formed integrally with the composite material 200 between the first ply or pack 400 and the second ply or pack 402. In that regard, the first ply or pack 400 and the second ply or pack 402 may be coupled to each other axially forward and axially aft of the metal lug 202. Upon reaching the axially forward end 404, the first ply or pack 400 may contact and extend aft along the radially outward surface 408. The second ply or pack 402 may contact the axially forward surface 410 and extend radially inward along the axially forward surface 410.

The tapered axially forward end 404 and axially aft end 406 may cause the metal lug 202 to operate as a tool during formation of the reinforced component 106. For example, the first ply or pack 400 and the second ply or pack 402 may be placed in their final desired position by placing them flush with the metal lug 202. After being placed in their final desired position, the first ply or pack 400, the second ply or pack 402, and the metal lug 202 may be heated or otherwise treated to couple the first ply or pack 400, the second ply or pack 402, and the metal lug 202 together. In various embodiments, the first ply or pack 400 and the second ply or pack 402 may include or be pre-cured details that may be assembled to the metal lug 202 using an adhesive 420.

Figure 7:
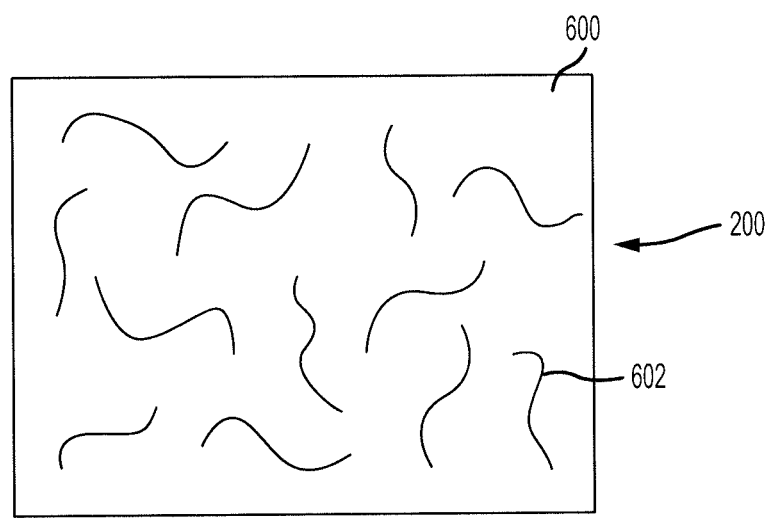
FIG. 7 illustrates a portion of the composite material of FIG. 5 including fibers and resin, in accordance with various embodiments.

An outer surface 418 of the metal lug 202 may be coated with the adhesive 420, or the adhesive 420 may be wrapped around the outer surface 418. Referring to FIGS. 5 and 7, the adhesive 420 may be selected to be compatible with the resin 600 of the composite material 200, and may also bond to the metal lug 202. Stated differently, the adhesive 420 may bond with the resin 600 with relative ease, thus facilitating a connection or bond between the resin 600 of the composite material 200 and the metal lug 202.

Returning reference to FIGS. 4 and 5, the flowpath surface 110 of the reinforced component 106 may be contoured based on desired properties of the airflow passing thereover. In order to facilitate such contours, the radially outward surface 408 of the metal lug 202 may be contoured to have a similar or the same shape as the desired shape of the flowpath surface 110. In that regard, the first ply or pack 400 may be placed flush with and bonded to the radially outward surface 408 to form the flowpath surface 110.

Figure 2:
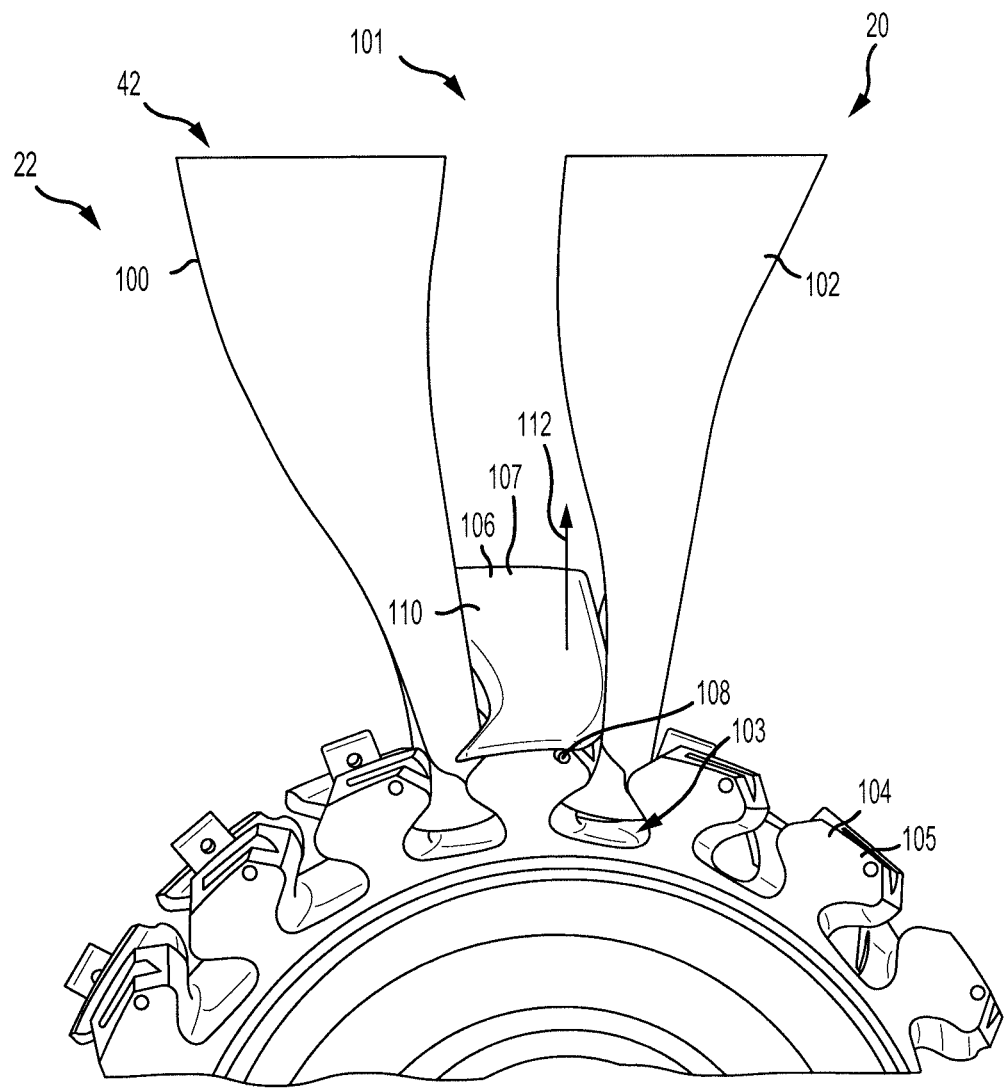
FIG. 2 is an axial view of a portion of a fan section of the gas turbine engine of FIG. 1, in accordance with various embodiments.
Figure 6:
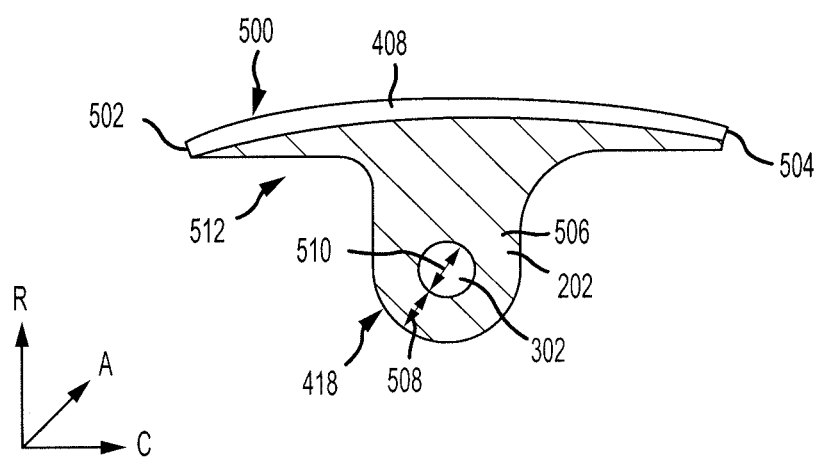
FIG. 6 is a cross-sectional view of the metal lug of FIG. 5, in accordance with various embodiments.

Referring now to FIG. 6, the metal lug 202 may include a main body 506 and two circumferential wings 500 (including a first circumferential wing 502 and a second circumferential wing 504) extending circumferentially outward from the main body 506. Referring briefly to FIGS. 2 and 6, the circumferential wings 500 may extend between the first blade 100 and the second blade 102. In some embodiments, the circumferential wings 500 may extend for a distance that is less than the distance from the first blade 100 to the second blade 102.

Returning reference to FIG. 6, the circumferential wings 500 may provide advantages. For example, due to the shape of the circumferential wings 500, a void 512 exists between radially outer ends of the circumferential wings 500 and the main body 506. Inclusion of this void 512 (stated differently, the lack of material) results in the metal lug 202 having less mass than if the void 512 failed to exist.

Referring to FIGS. 5 and 6, dimensions of the metal lug 202 may vary based on the size of a corresponding gas turbine engine and the location of the reinforced component 106 within the gas turbine engine. The metal lug 202 may include a first axial distance 414 at a radially inward end 424 and a second axial distance 422 at the radially outward surface 408. In various embodiments, the first axial distance 414 may be between 100 thousandths of an inch (100 mils) and 1 inch (2.54 millimeters (mm) and 25.4 mm), between 100 mils and 800 mils (2.54 mm and 20.3 mm), or between 200 mils and 700 mils (5.08 mm and 17.8 mm). In various embodiments, the second axial distance 422 may be between 0.5 inches and 5 inches (12.7 mm and 127 mm), between 0.5 inches and 4 inches (12.7 mm and 101.6 mm), or between 0.5 inches and 3 inches (12.7 mm and 76.2 mm).

The metal lug 202 may further include a radial distance 416. In various embodiments, the radial distance 416 may be between 0.5 inches and 10 inches (12.7 mm and 254 mm), between 0.5 inches and 5 inches (12.7 mm and 127 mm), or between 1 inch and 3 inches (25.4 mm and 76.2 mm).

The metal lug 202 may also include a distance 508 between the through hole 302 and the outer surface 418. In various embodiments, the distance 508 may be between 0.25 inches and 3 inches (6.35 mm and 76.2 mm), between 0.5 inches and 2 inches (12.7 mm and 50.8 mm), or between 0.5 inches and 1 inch (12.7 mm and 25.4 mm). The size of the distance 508 may be selected based on an amount of force applied to the metal lug 202 via a received pin.

The through hole 302 may have an opening diameter 510. In various embodiments, the opening diameter 510 may be between 100 mils and 1 inch (2.54 mm and 25.4 mm), between 250 mils and 750 mils (6.35 mm and 19.1 mm), or between 300 mils and 600 mils (7.62 mm and 15.2 mm). The opening diameter 510 may be selected based on a size of a received pin.

Use of the metal lug 202 in the reinforced component 106 provides advantages. For example, the metal lug 202 may provide a relatively strong connection point while utilizing a relatively little amount of space (i.e., a provides greater strength per measure of edge distance than alternative options such as non-integral lugs). This may be especially useful if the reinforced component 106 has relatively little space available for a connection feature. Furthermore, this may advantageously reduce the weight of the reinforced component 106 as relatively little metal is required to facilitate the connection.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A reinforced component for use in a gas turbine engine having an axis, the reinforced component comprising:
   a metal lug having a main body and two circumferential wings extending circumferentially outward from the main body, being tapered to an edge towards an axially forward end and an axially aft end, and being configured to be attached to a secondary component; and
   a composite material integrally formed around the metal lug, extending forward and aft of the metal lug, and configured to be retained in place relative to the secondary component via an attachment between the metal lug and the secondary component.

2. The reinforced component of claim 1, wherein the composite material includes fibers and a resin to resist relative movement of the fibers.

3. The reinforced component of claim 2, further comprising an adhesive that is compatible with the resin and is positioned around the metal lug to facilitate joining the metal lug to the composite material.

4. The reinforced component of claim 1, wherein the metal lug defines a through hole configured to receive a pin, and the metal lug is configured to be attached to the secondary component via the pin.

5. The reinforced component of claim 1, wherein the composite material forms a platform configured to be positioned between blades of a gas turbine engine, and the secondary component is a hub of the gas turbine engine.

6. The reinforced component of claim 1, wherein:
the composite material is configured for use with a gas turbine engine having an axis; and
the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

7. The reinforced component of claim 1, wherein the metal lug has a radially outward surface that is contoured to a desired shape of the composite material.

8. A system for coupling components of a gas turbine engine having an axis, the system comprising:
a secondary component defining a component opening;
a reinforced component having:
a metal lug having a main body and two circumferential wings extending circumferentially outward from the main body, being to an edge tapered towards an axially forward and an axially aft end, and defining a through hole, and
a composite material integrally formed around the metal lug and extending forward and aft of the metal lug; and
a pin configured to extend through the component opening and the through hole to couple the reinforced component to the secondary component.

9. The system of claim 8, wherein the composite material includes fibers and a resin to resist relative movement of the fibers.

10. The system of claim 9, wherein the reinforced component further includes an adhesive that is compatible with the resin and is positioned around the metal lug to facilitate joining the metal lug to the composite material.

11. The system of claim 8, wherein the secondary component is a hub of the gas turbine engine, and the composite material forms a platform configured to be positioned between blades of the gas turbine engine.

12. The system of claim 11, wherein the blades are blades of a fan section of the gas turbine engine and the two circumferential wings are configured to extend between two of the blades.

13. The system of claim 8, wherein the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

14. The system of claim 8, wherein the metal lug has a radially outward surface that is contoured to a desired shape of the composite material.

15. A gas turbine engine having an axis, the gas turbine engine, comprising:
a fan section having blades;
a compressor section configured to compress air received from the fan section;
a combustor section configured to combust a mixture of fuel and the air to generate exhaust;
a turbine section configured to receive the exhaust and convert the exhaust into mechanical energy to drive the blades;
a secondary component positioned in at least one of the fan section, the compressor section, the combustor section, or the turbine section and defining a component opening;
a reinforced component having:
a metal lug having a main body and two circumferential wings extending circumferentially outward from the main body, being tapered to an edge towards an axially forward and an axially aft end, and defining a through hole, and
a composite material integrally formed around the metal lug and extending forward and aft of the metal lug; and
a pin configured to extend through the component opening and the through hole to couple the reinforced component to the secondary component.

16. The gas turbine engine of claim 15, wherein the composite material includes fibers and a resin to resist relative movement of the fibers, and the reinforced component further includes an adhesive that is compatible with the resin and is positioned around the metal lug to facilitate joining the metal lug to the composite material.

17. The gas turbine engine of claim 15, wherein the composite material includes a first ply or pack and a second ply or pack coupled together forward and aft of the metal lug with the first ply or pack contacting and extending over a radially outward surface of the metal lug and the second ply or pack contacting and extending radially inward along an axially forward surface of the metal lug.

18. The gas turbine engine of claim 15, wherein the metal lug has a radially outward surface that is contoured to a desired shape of the composite material.

* * * * *